July 28, 1959

G. JANSEN 2,896,496

CLAMP NUT APPARATUS

Filed Jan. 31, 1958

INVENTOR.
GERHART JANSEN
BY *M. Ralph Shaffer*
HIS ATTORNEY

United States Patent Office 2,896,496
Patented July 28, 1959

2,896,496

CLAMP NUT APPARATUS

Gerhart Jansen, Salt Lake City, Utah

Application January 31, 1958, Serial No. 712,545

9 Claims. (Cl. 85—36)

This invention is a companion to that for which an application for Letters Patent, Serial No. 706,080 has previously been filed, the present invention constituting an improvement thereon.

Both inventions relate to clamping apparatus for fixedly clamping bolts, studs, shafts, wire, and so forth, and, in particular, are useful for securing equipment to mounting plates, baffles or bulkheads where the equipment is itself provided with mounting bolts or studs, for example, be they threaded or unthreaded.

Both inventions utilize in their design a plurality of gripping jaws, each generally taking the form of a wedge-shaped element having an interior surface which is cylindrically concave and serrated and an external surface resembling the surface of a truncated cone segment. These gripping jaws serve to bite into a bolt, for example, disposed therebetween when the jaws are forced into the tapered socket end of an externally threaded, cylindrical carrier, as by means of a cap, threaded onto the carrier, supplying thrust thereto.

The prior invention employed a C configured spring to hold circumferentially in place a pre-selected number of jaw elements. Accordingly, the apparatus of the prior invention is suitable to accommodate the gripping of bolts and shafts of various diameters.

The present invention, however, substitutes for the C configured spring a simple strap spring. When in flat pattern layout, the strap spring is simply of rectangular configuration and is stamped from sheet stock such as tempered brass or spring steel. The several jaw elements are each provided with a lateral, circumferential groove area undercut at both sides thereof so as to accommodate the placement therewithin of the strap spring. The strap spring is caused to assume a cylindrical disposition, with opposite ends of the spring overlapping. Thus, the several jaw elements cooperating therewith may be disposed in a circular pattern and, preferably, are regularly spaced.

Having such a configuration, the spring is well adapted to hold the several jaw elements in place; further, the slight outward thrust supplied to the jaw elements by the strap spring insures a snug fit of the jaw elements within the socket accommodating the same at times when longitudinally directed thrust is reduced or withdrawn from the jaw elements.

The utility of the present invention is enhanced when the groove areas of the jaw elements are tapered. Such configuration insures the opening of the jaw element ends, and the backing away of the elements themselves from the associated socket when longitudinal thrust forces are reduced or removed. Accordingly, the present invention allows for the easy accommodation of bolts, studs and shafts of widely varying diameters.

Therefore, an object of the present invention is to provide improved clamp nut apparatus.

A further object of the present invention is to provide new and improved clamping apparatus for securing bolts, studs, shafts, and so forth.

A particular object of the present invention is to provide new and improved jaw means for clamping apparatus which will back away from the socket with which the jaw means is associated when thrust forces are reduced thereon, and which will insure that the ends of the jaw elements will open satisfactorily, once thrust upon the jaw elements is reduced, so as to admit the reception therebetween of shafts and studs of yet larger diameter.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

Figure 1:
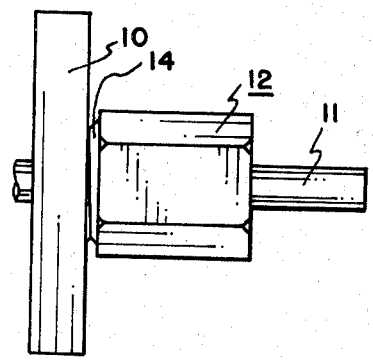
Figure 1 is an elevation of one type of clamp nut apparatus employing the present invention.
Figure 2:
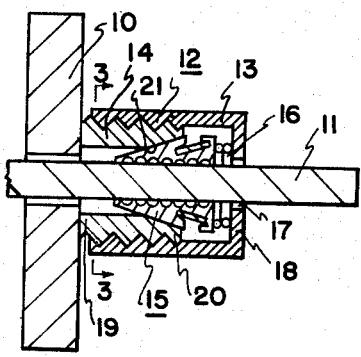
Figure 2 is a vertical section of the apparatus of Figure 1.

In Figures 1 and 2 external member 10 represents a bulkhead, mounting plate or the like. Passing through external member 10 is an additional external member 11, which may comprise a shaft, stud, bolt or the like. Let it be assumed that it is desired for member 11 to be clamped by a clamp nut apparatus 12, the same to apply a tension force to member 11. Clamp nut apparatus 12 includes an internally threaded cap 13, and externally threaded cylindrical carrier 14, with gripping means 15 and compression spring 16. As is seen with reference to Figure 2, external member 11 passes through an aperture 17 provided in base 18 of cap 13. Cap 13 itself is threaded onto carrier 14. Carrier 14 includes first and second end portions 19 and 20, the latter being provided with an interior socket 21. Jaw or gripping means 15 is externally tapered and cooperates with socket 21 so as to bite into external member 11 when thrust is supplied by cap 13 via compression spring 16.

Figure 3:
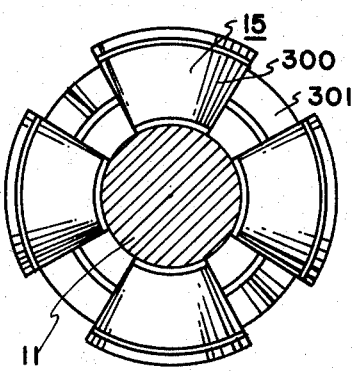
Figure 3 is an enlarged view, partly in cross section, taken along the line 3—3 in Figure 2, but with some of the parts of the apparatus removed for purposes of clarity.

The jaw gripping means 15 is indicated with particularity in Figure 3. As before mentioned, Figure 3 is a view, partly in cross section, taken along the line 3—3 in Figure 2, but not showing either cylindrical carrier 14 or cap 13, for purposes of clarity. Jaw gripping means 15 comprises a plurality of jaw elements 300 circumferentially contained by spring 301. Each of the jaw gripping elements 300 preferably is provided with an external tapered surface and an interior serrated surface of general cylindrical configuration.

Before considering the configuration of the jaw gripping elements 300 with particularity, it is first necessary to mention the form and material of strap spring 301.

Figure 4:
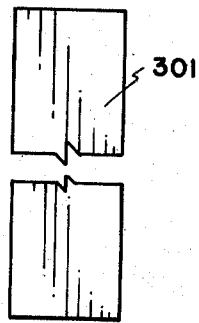
Figure 4 is an enlarged flat pattern layout of the strap spring utilized by the present invention.

Reference is now made to Figure 4. In Figure 4 strap spring 301 is shown in the flat pattern layout to have a generally rectangular configuration. Strap spring 301 may be conveniently stamped from sheet stock such as spring steel or tempered brass.

Figure 5:
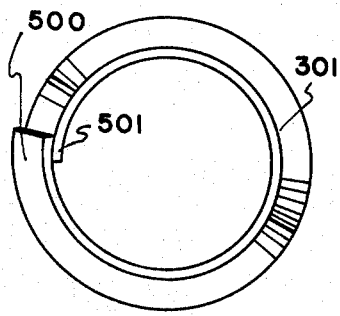
Figures 5 and 6 are enlarged front and side elevations of the strap spring shown in Figure 4 when in its developed form.
Figure 6:
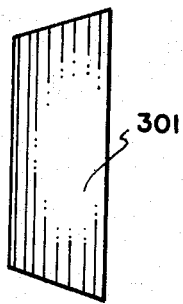

Figures 5 and 6 are front and side elevations of strap spring 301 when in its springingly constrained developed form when the same is retaining the jaws of Figure 2. While the developed form may be substantially cylindrical, yet, and as will appear later, the preferred form is as shown, namely, a sector of a conical surface, i.e. frusto-conical. It will be noted with reference to Figure 5 that opposite ends 500 and 501 of the strap spring overlap.

Figure 7:
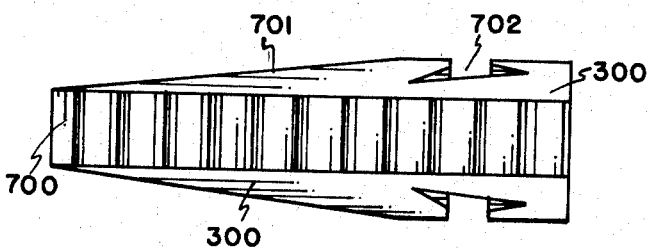
Figures 7 and 8 are enlarged front and side elevations of a representative jaw element employed in the present invention.
Figure 8:
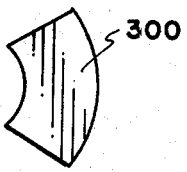
Figure 9:
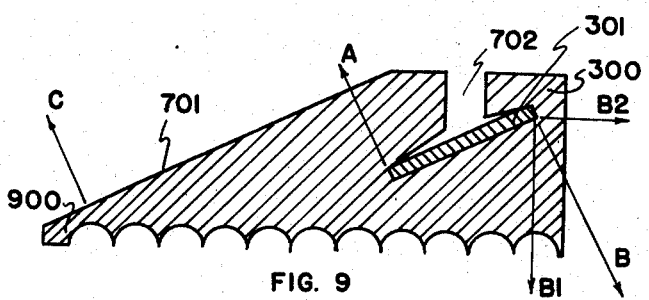
Figure 9 is an enlarged section of the jaw element shown in Figures 7 and 8, showing the inter-cooperation and inter-action of the strap spring in Figure 4 with the jaw elements.

A representative jaw element employed with strap spring 301 is illustrated in Figures 7 through 9. The several jaw elements 300 are preferably manufactured from hardened tool steel and include an internal, serrated, concave surface 700, a tapered exterior surface 701, and an undercut groove area 702 generally in communication with surface 701. As is seen with reference to Figures 7 and 9, groove area 702 is disposed laterally and circumferentially with respect to the respective jaw element 300. Accordingly, with both sides of the groove area 702 being undercut, the strap spring 301 is easily retained therewithin. See in this regard Figure 9.

Figure 9 illustrates in cross section the inter-cooperation of strap spring 301 with jaw element 300. It is to be noted, particularly, that the cross section of strap spring 301 is declined relative to the horizontal in the same direction as the tapered exterior of jaw element 300. This is true by virtue of a developed form of strap spring 301 as shown in Figures 5 and 6. By virtue of its resilient nature, strap spring 301 tends to return to a cylindrical configuration, as is evidenced by the force vectors A and B in Figure 9. Vectors A and B thus tend to produce a slight rotational displacement of jaw element 300 in a clockwise direction. Hence, jaw end 900 tends to advance in the direction shown by the arrow C, which in turn produces an opening up of a composite jaw means. Force vector B may be resolved into two components: B1 and B2. Force vector B2 illustrates that, by virtue of the spring action, there will tend to be a backing away of the jaw means with respect to its socket (see socket 21 in Figure 2) when the thrust supplied jaw means 15 via compression spring 16 and cap 12 is reduced. Thus, it is important to note that the jaw means 15 is self-opening, by virtue of the spring action, once longitudinal thrust is removed therefrom. This is an extremely important feature when it is desired to insert studs or bolts within the jaw means of increasingly larger diameter.

While the preferred embodiment of the invention is as is illustrated in Figures 5, 6 and 9, yet it is true that the invention does offer some advantages even though the several groove areas 701 square-cut relative to the horizontal, for the undercut areas will serve to retain spring and jaw elements in their desired position; further, the number of the jaw gripping elements employed may be varied as desired so as to accomplish the results indicated in the previous invention above referred.

The present invention offers equal advantages even though the compression spring 16 in Figure 2 is not employed.

It will be understood with reference to Figure 2 that, upon turning or rotating cap 13 over cylindrical carrier 14 in a direction which progresses cap 13 toward member 10, the thrust exerted by compression spring 16 upon jaw means 15 will be increased, thus increasing the bite of jaw means 15 upon member 11. If the rotation of cap 13 is continued so that its forward end comes in contact with the associated base of member 10, then, upon continuing the rotation of cap 13 relative to cylindrical carrier 14, a force of tension will be exerted upon member 11. This is because of the fact that the cylindrical carrier 14 will tend to back away from the forward surface of external member 10 on the continued rotation of cap 13.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. Externally tapered jaw apparatus adapted to grip an elongate member disposed therewithin when thrust is applied to said apparatus to direct the same into a cooperating socket, said apparatus including, in combination: a plurality of jaw elements each having a cylindrically concave, serrated, inner surface and a conically tapered, convex, outer surface, each of said jaw elements being provided with a lateral groove area at said outer surface and undercut at both sides thereof; and a strap spring disposed within all of said groove areas of said jaw elements, said strap spring (normally flat) being springingly constrained in a cylindrical disposition with opposite ends of same overlapping, spacing said jaw elements regularly with respect to each other in a circular pattern about said elongate member so as to grip the same.

2. Apparatus according to claim 1 in which said groove areas of each of said jaw elements decline in the same direction as said conically tapered, convex outer surface of the respective jaw elements, said strap spring thereby being springingly constrained within said groove areas in frusto-conical configuration when said jaw elements are constrained in mutually parallel relationship.

3. Externally tapered jaw apparatus adapted to grip an elongate member disposed therewithin when thrust is applied to said apparatus to direct the same into a cooperating socket, said apparatus including, in combination: a plurality of jaw elements each having a concave, serrated, inner surface and a convex, tapered, outer surface, each of said jaw elements being provided with an exterior, lateral, groove area at said outer surface and undercut at both sides thereof; and a strap spring disposed within all of said undercut groove areas of said jaw elements, said strap spring (normally flat) being springingly constrained in a cylindrical disposition with opposite ends of same overlapping, spacing said jaw elements regularly with respect to each other in a circular pattern about said elongate member so as to grip the same.

4. Apparatus according to claim 3 in which said groove areas of each of said jaw elements decline in the same direction as said tapered, convex outer surface of the respective jaw elements, said strap spring thereby being springingly constrained within said groove areas in frusto-conical configuration when said jaw elements are constrained in mutually parallel relationship.

5. Clamp nut apparatus including, in combination, an externally threaded tubular carrier having first and second end portions, said second end portion being provided with an interior, tapered socket; externally tapered jaw means, for engaging an external elongate member, disposed interiorly of and cooperatively associated with said tapered socket; an internally threaded cap threaded onto said second end portion of said tubular carrier for advancement toward said jaw means; a compression spring cooperatively disposed between said jaw means and said cap; said jaw means comprising: a plurality of jaw elements each having a cylindrically concave, serrated, inner surface and a conically tapered, convex, outer surface, each of said jaw elements being provided with a lateral groove area at said outer surface and undercut at both sides thereof; and a strap spring disposed within all of said groove areas of said jaw elements, said strap spring (normally flat) being springingly constrained in a cylindrical dispositon with opposite ends of same overlapping, spacing said jaw elements regularly with respect to each other in the circular pattern about said elongate member.

6. Apparatus according to claim 5 in which said groove areas of each of said jaw elements decline in the same direction as said conically tapered, convex outer surface of the respective jaw elements, said strap spring thereby being springingly constrained within said groove areas in frusto-conical configuration when said jaw elements are constrained in mutually parallel relationship.

7. Clamp nut apparatus including, in combination, an externally threaded tubular carrier having first and second end portions, said second end portion being provided with an interior, tapered socket; externally tapered jaw means, for engaging an external elongate member, disposed interiorly of and cooperatively associated with said tapered socket; an internally threaded cap threaded onto said second end portion of said tubular carrier for advancement toward said jaw means; said jaw means comprising: a plurality of jaw elements each having a cylindrically concave, serrated, inner surface and a conically tapered, convex, outer surface, each of said jaw elements being provided with a lateral groove area at said outer surface and undercut at both sides thereof; and a strap spring disposed within all of said groove areas of said jaw elements, said strap spring (normally flat) being springingly constrained in a cylindrical disposition with opposite ends of same overlaping, spacing said jaw elements regularly with respect to each other in the circular pattern about said elongate member.

8. Apparatus according to claim 7 in which said groove areas of each of said jaw elements decline in the same direction as said conically tapered, convex outer surface of the respective jaw elements, said strap spring thereby being springingly constrained within said groove areas in frusto-conical configuration when said jaw elements are constrained in mutually parallel relationship.

9. Externally tapered jaw apparatus adapted to grip an elongate member disposed therewithin when thrust is applied to said apparatus to direct the same into a cooperating socket, said apparatus including, in combination: a plurality of jaw elements each having a concave, serrated, inner surface and a convex, tapered, outer surface, each of said jaw elements being provided with an exterior, lateral, groove area at the outer surface and undercut at both sides thereof; a strap spring disposed within all of said undercut groove areas of said jaw elements, said strap spring (normally flat) being springingly constrained in a cylindrical disposition with opposite ends of same overlapping, spacing said jaw elements regularly with respect to each other in a circular pattern about said elongate member so as to grip the same; and means for retaining said strap spring within said groove areas.

References Cited in the file of this patent
UNITED STATES PATENTS

| | | |
|---|---|---|
| 491,469 | Carver | Feb. 7, 1893 |
| 674,244 | McGeorge | May 14, 1901 |
| 1,833,661 | Stull | Nov. 24, 1931 |
| 2,215,072 | Rogoff | Sept. 17, 1940 |